United States Patent [19]

Mihara

[11] Patent Number: 5,424,860

[45] Date of Patent: Jun. 13, 1995

[54] BIDIRECTIONAL TRANSMISSION APPARATUS

[75] Inventor: Kanji Mihara, Kanagawa, Japan

[73] Assignee: Sony Corporation, Japan

[21] Appl. No.: 149,307

[22] Filed: Nov. 9, 1993

[30] Foreign Application Priority Data

Nov. 9, 1992 [JP] Japan .................................. 4-324985

[51] Int. Cl.$^6$ .............................................. H04B 10/00
[52] U.S. Cl. ................................... 359/152; 359/143; 359/163
[58] Field of Search ............... 359/113, 115, 143, 147, 359/152, 163; 455/75, 79, 90; 370/24, 29, 30, 38, 39, 50, 69.1, 95.3, 127

[56] References Cited

U.S. PATENT DOCUMENTS

| 4,850,044 | 7/1989 | Block et al. | 359/163 |
| 5,065,455 | 11/1991 | Ito et al. | 359/1.59 |
| 5,204,866 | 4/1993 | Block et al. | 359/152 |
| 5,237,166 | 8/1993 | Ito et al. | 250/201.1 |
| 5,335,361 | 8/1994 | Ghaem | 359/152 |

FOREIGN PATENT DOCUMENTS

| 0437161A3 | 7/1991 | European Pat. Off. | H04B 10/00 |
| 1-305734 | 12/1989 | Japan | H04B 9/00 |
| 2181920 | 4/1987 | United Kingdom | H04B 9/00 |

OTHER PUBLICATIONS

Patent Abstracts of Japan, vol. 7, No. 154 (E-185) 1983 & JP-A-58 064 834 (Yokogawa).

Primary Examiner—David K. Moore
Assistant Examiner—Kinfe-Michael Negash
Attorney, Agent, or Firm—Limbach & Limbach; Charles P. Sammut

[57] ABSTRACT

A bidirectional transmission apparatus, such as an optical atmospheric link apparatus which sends information signals to and receives information signals from a communicating object using modulated light beams which propagate in the atmosphere. The invention enables the sending and receiving channel frequencies to be set simply and easily, to avoid interference between signals transmitted simultaneously over the sending and receiving channels. The apparatus of the invention includes a housing with slots. Each slot changeably accommodates a sending wiring board or a receiving wiring board. A control unit can set the operating frequency of each board at a particular frequency assigned to the slot in which the board is housed. The apparatus of the invention also includes an intercom circuit for communicating with the communicating object.

13 Claims, 9 Drawing Sheets

BIDIRECTIONAL TRANSMISSION APPARATUS

FIELD OF THE INVENTION

This invention relates to a bidirectional transmission apparatus, which can be applied to, for example, an optical atmospheric link apparatus which sends information signals to and receives information signals from an object of communication by means of light beams propagated through the atmosphere.

DESCRIPTION OF THE RELATED ART

There has been proposed a conventional optical atmospheric link apparatus which receives a part of the sending light beam sent to a communicating object by reflection, so that a location irradiated by the light beam on the communicating object can be easily detected by the sending apparatus side (Japanese Patent Application No. 138120/1988).

In an optical atmospheric link apparatus of this kind, a laser diode is driven with a specified information signal, and a light beam with a specified plane of polarization is emitted from the laser diode. This outgoing light beam is then sent to the communicating object via a specified optical system. The information signal is transmitted by means of the light beam, L1. Moreover, in the optical atmospheric link apparatus, the incoming light beam received from the communicating object is further received by a specified light receiving element, the output signal of which is then processed in a specified signal processing circuit. Thus, the information signal from the communicating object is received by means of the incoming light beam.

In the optical atmospheric link apparatus, a part of the outgoing light beam is further separated and reflected to bend along its optical axis, and the light beam thus reflected is then picked up together with the scene of the communicating object.

Therefore, in the optical atmospheric link apparatus, the location at which the outgoing light beam is irradiated can be detected as a bright spot in the picked-up image of the communicating object, making it possible to simplify installation work. As a result, video signals picked up with a TV camera while carrying the system around outdoors can be easily relayed.

In a bidirectional communication system of this kind, it is necessary to prevent interference between the outgoing and incoming information signals by setting the modulation frequencies of information signals to be sent and received at different values. Particularly, in an optical atmospheric link apparatus of this kind, some nonlinear distortion cannot be avoided in so far as a laser diode has to be driven. Therefore, the outgoing and incoming information signals cannot be sent to the communicating object and received from the same if the frequencies of information signals to be sent and received are equal.

As shown in FIG. 7, one possible method to resolve this problem would be to allocate the modulation frequencies of odd-numbered channels 1, 3, and 5 to the first optical atmospheric link apparatus 1. The modulation frequencies of the second optical atmospheric link apparatus 2, which is a communicating object for the first atmospheric link apparatus, would be allocated the even-numbered channels 2, 4, and 6.

However, in the optical atmospheric link apparatus 1 and 2 to which the channels have thus once been allocated, information signals can no longer be sent and received with communicating objects to which a conflicting allocation of even-numbered channels and odd-numbered channels has been made.

That is, if the channels are thus allocated to the optical atmospheric link apparatus 1 and 2, the interchangeability of optical atmospheric link apparatus will be impaired. Productivity will fall, because it becomes necessary to produce two types of optical atmospheric link apparatus.

Moreover, such a channel allocation as described above makes it difficult for a user to set as many sending and receiving channels as necessary. It thus becomes impossible for the user to take advantage of the merits of the optical atmospheric link apparatus, namely portability and ease-of-installation.

One possible solution (shown in FIG. 8) to this problem is to arrange sending slots 6A through 6F and receiving slots 8A through 8F for sending wiring boards and receiving wiring boards, respectively, in both optical atmospheric link apparatus 4A and optical atmospheric link apparatus 4B, such that the sending slots 6A-6F have a one-to-one correspondence with the receiving slots 8A-8F, as shown in FIG. 8.

Sending slots 6A-6F in apparatus 4A are connected to an optical multiplexer circuit 10A, while sending slots 6A-6F in apparatus 4B are also connected to an optical multiplexer circuit 10B, thus multiplexing the modulation signals from sending slots 6A-6F.

The receiving slots 8A-8F, on the other hand, are connected to the optical branching circuit 12A (in apparatus 4A) or to the optical branching circuit 12B (in apparatus 4B), such that transmitted modulation signals are output to the receiving slots 8A-8F respectively.

In this case, common channels are allocated to the receiving slots 8A-8F corresponding respectively to the sending slots 6A-6F. Thus, one communication line can be secured by housing a sending wiring board in the first sending slot 6A of optical atmospheric link apparatus 4A, for example, and correspondingly housing a receiving wiring board in the first receiving slot 8A of second optical atmospheric link apparatus 4B.

Thus, desired sending and receiving channels can be set up by housing sending or receiving wiring boards in the corresponding slots 6A-6F and 8A-8F as necessary.

However, with this method, there is the problem that redundant free slots will remain. As a result, the number of slots tends to increase disproportionately to the number of sending and receiving channels.

Another possible method, apart from the above, is to house a sending wiring board and a receiving wiring board in a common slot. In this case, the channels may be set with selective switches built into the sending and receiving wiring boards. This method, however, is still problematic in that channel mis-setting is unavoidable since channel setting is left to each user's selective operation.

Moreover, such optical atmospheric link apparatus require communication lines, which themselves require sending and receiving frequencies to be set at different values, and also require interchangeability between the optical atmospheric link apparatus.

In view of the foregoing, the present invention provides a compact bidirectional transmission system allowing the operating frequencies of its sending and receiving channels to be set simply and easily.

SUMMARY OF THE INVENTION

In order to solve the problems of the prior art, the present invention presents a bidirectional transmission system 11 (shown in FIGS. 1, 2, 3) which sends information signals (SAAI-SVAI) to a specified communicating object 1 1B (shown in FIG. 3) and receives information signals (SDA-SDF) from the communicating object 11B.

The bidirectional transmission system includes a first wiring board housing means 22A for variably housing either a sending wiring board 28 or a receiving wiring board 30. The sending wiring board 28 includes means for asserting modulation signals SMA-SMF with specified frequencies to a first connector in response to inputted information signals SAAI - SAFI and SVAI - SVFI. The receiving wiring board 30 includes means for receiving information signals SDA - SDF on the first connector and demodulating the information signals.

The bidirectional transmission also includes a second wiring board housing means 22B for variably housing a sending wiring board 28 or a receiving wiring board 30. The sending wiring board 28 includes means for asserting modulation signals SMA-SMF with specified frequencies to a second connector in response to inputted information signals SAAI - SAFI and SVAI - SVFI. The receiving wiring board 30 includes means for receiving information signals SDA - SDF on the second connector and demodulating the information signals.

The bidirectional transmission system also includes a multiplexing circuit 24 that multiplexes modulation signals SMA - SMF from the first and second connectors, generates a multiplexed signal S1, and sends the multiplexed signal S1 to the communicating object 11B.

The bidirectional transmission system also includes a distribution circuit 20 which distributes the multiplexed signal S2 received from the communicating object 11B to the first connector and the second connector.

The bidirectional transmission system also includes a control circuit 34 which outputs control data DA-DF to the first and second connectors. Each sending wiring board 28, connected to one of the connectors, switches the frequencies of the modulation signals SMA-SMF according to the control data DA-DF. Each receiving wiring board 30, connected to one of the connectors, switches demodulation frequencies of the incoming information signals SDA-SDF according to the control data DA-DF. The control circuit 34 outputs the control data DA-DF such that the frequency for each separately housed sending wiring board 28 (or receiving wiring board 30) is discrete and preset for the housing means 22A or 22B in which the board is housed. The control circuit 34 includes a wiring board distinguishing means for distinguishing one wiring board from another housed in the first and second wiring board housing means 22A and 22B.

Moreover, the bidirectional transmission system of the invention further includes a communication ("intercom") circuit 26 which generates an outgoing communication signal SINO to be sent to the communicating object 11B, and demodulates an incoming communication signal SINI received from the communicating object 11B.

The multiplexing circuit 24 multiplexes the outgoing communication signal SINO (as well as the modulation signals SMA - SMF) to generate the multiplexed signal S1, while the distribution circuit 20 distributes the multiplexed signal S2, transmitted from the communicating object 11B, to the first and second connectors and the communication circuit 26.

The control circuit 34 switches the behavior of the communication circuit 26 depending on the result (DS) of an operation distinguishing one wiring board from another wiring board by the wiring board distinguishing means. Specifically, the control circuit 34 switches the frequency of the outgoing communication signal SINO and the demodulation frequency of the incoming communication signal SINI, depending on whether a sending wiring board 28 or a receiving wiring board 30 is housed in the first or second wiring board housing means 22A and 22B.

Furthermore, in the bidirectional transmission system of this invention, the control circuit 34 sets the frequency of the outgoing communication signal SINO and the demodulation frequency of the incoming communication signal SINI at a first frequency CHA and a second frequency CHB, respectively, when a sending wiring board 28 is housed in the first wiring board housing means 22A. Alternatively, the control circuit 34 sets the frequency of the outgoing communication signal SINO and the demodulation frequency of the incoming communication signal SINI at CHB and CHA, respectively, when a receiving wiring board 30 is housed in the first wiring board housing means 22A. Moreover, the control circuit 34 sets the frequency of the outgoing communication signal SINO and the demodulation frequency of the incoming communication signal SINI at CHA and CHB respectively, when neither a sending wiring board 28 nor a receiving wiring board 30 is housed in first wiring board housing means 22A but a sending wiring board 28 is housed in the second board housing means 22B. On the other hand, the control circuit 34 sets the frequency of the outgoing communication signal SINO and the demodulation frequency of the incoming communication signal SINI at CHB and CHA, respectively, when neither a sending wiring board 28 nor a receiving wiring board 30 is housed in the first wiring board housing means 22A but a receiving wiring board 30 is housed in the second wiring board housing means 22B. Furthermore, in the bidirectional transmission system of this invention, the multiplexing circuit 24 drives a laser light source 13 which transmits the inputted information signals SAAI - SAFI and SVAI SVFI as a light beam L1 to the communicating object 11B, while the distribution circuit 20 receives a multiplexed signal S2 from the communicating object 11B via a light beam L2 sent from the communicating object 11B.

A sending wiring board 28 and a receiving wiring board 30 can be variably housed in the first and second wiring board housing means 22A and 22B. Control data DA-DF are delivered to the housing means for changing the operating frequency of the wiring boards, such that the operating frequencies of the sending wiring board 28 and the receiving wiring board 30 are preset for the first and second wiring board housing means 22A and 22B. As a result, simple setting of frequencies for the sending and receiving channels is made possible while maintaining interchangeability between the transmitting and communicating objects in the general system.

DETAILED DESCRIPTION OF THE PREFERRED EMBODIMENTS

Preferred embodiments of this invention will be described with reference to the accompanying drawings.

Figure 1:
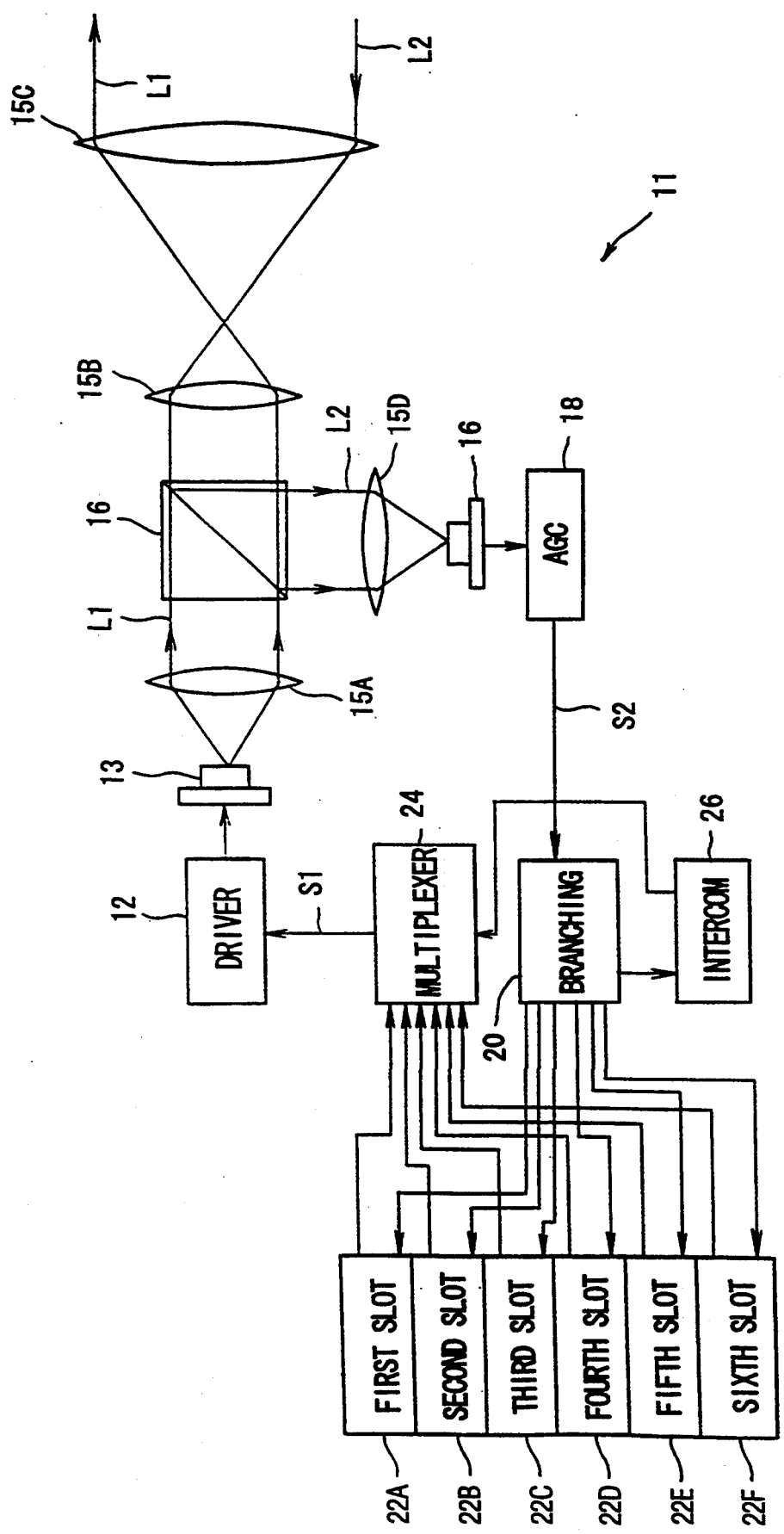
FIG. 1 is a schematic diagram of a bidirectional transmission apparatus according to an embodiment of this invention.

In FIG. 1, an optical atmospheric link apparatus 11 includes a driver 12 which drives a laser diode 13, sending a light beam L1 with a particular plane of polarization.

In the optical atmospheric link apparatus 11, the light beam L1 is transformed by a lens 15A into parallel rays of light, which then pass through a polarizing beam splitter 16 to lenses 15B and 15C. The outgoing light beam L1 is thus formed in a predetermined shape.

The optical atmospheric link apparatus 11 transmits the light beam L1 to a communicating object (e.g., object 11B shown in FIG. 3), such that a desired information signal S1 is sent by means of the light beam L1.

Moreover, in the optical atmospheric link apparatus 11, an incoming light beam L2 arriving from the communicating object is received into the lens 15C and is then guided through lens 15B to the polarizing beam splitter 16.

The plane of polarization of the incoming light beam L2 sent from the communicating object intersects orthogonally with the plane of polarization of the outgoing light beam L1, whereupon the light beam L2 is reflected by the polarizing beam splitter 16 into a lens 15D.

The lens 15D causes the light beam L2 to converge on a light receiving element 16. The element 16 then outputs a signal to a branching circuit 20 via an AGC circuit 18.

Moreover, in this embodiment, the optical atmospheric link apparatus 11 has six slots 22A-22F which are capable of accommodating card-type wiring boards. The output signals from these wiring boards are added in an optical multiplexer circuit 24 consisting of adders, whereupon modulating signals generated in the respective sending wiring boards are frequency-multiplexed to generate an information signal S1.

Furthermore, in the optical atmospheric link apparatus 11, modulation signals generated by an intercom circuit 26 are frequency-multiplexed by the optical multiplexer circuit 24 in addition to the modulating signals generated in the sending wiring boards, whereupon various signals for communication can be transmitted to communicating objects.

Branching circuit 20 separates a received information signal S2 into components according to frequency bands, the signal components of which are then output respectively to the six slots 22A-22F and the intercom circuit 26. Information signals from the communicating object can be processed by plugging receiving wiring boards into the desired slots 22A-22F in place of sending wiring boards. Communication signals from the communicating object can be demodulated via the intercom circuit 26.

Thus, in the optical atmospheric link apparatus 11, desired sending and receiving channels can be secured by plugging sending wiring boards or receiving wiring boards into the six slots 22A-22F as necessary.

Figure 2:
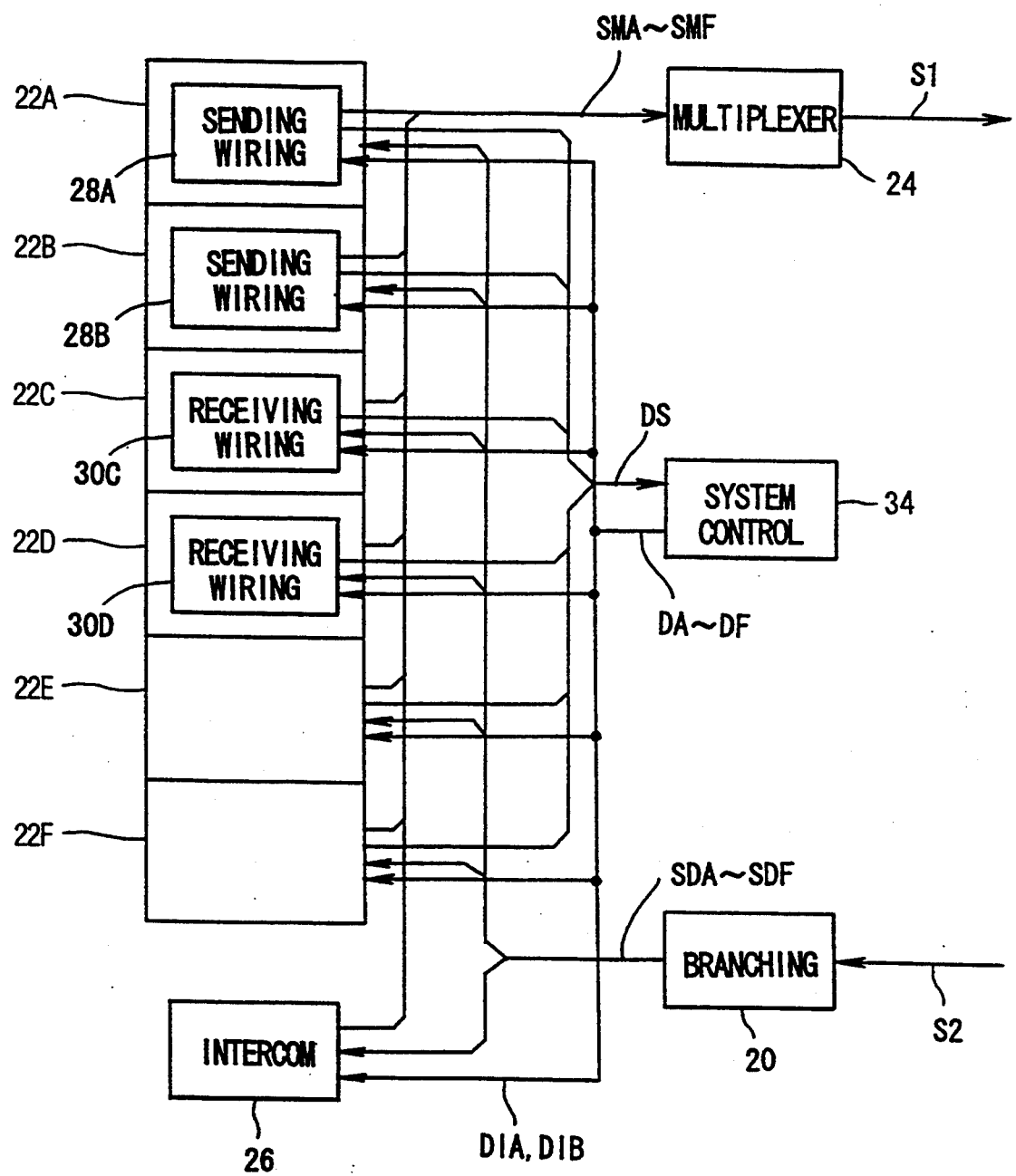
FIG. 2 is a block diagram illustrating the connections between the slots of the FIG. 1 apparatus.

In the slots 22A-22F, as shown in FIG. 2, card-shape wiring boards are connected through connectors to a mother wiring board, on which the multiplexer circuit 24, the branching filter circuit 20, and the intercom circuit 26 are formed.

That is, on the mother wiring board, each slot 22A-22F is connected to the multiplexer circuit 24 and the branching circuit 20. Thus, if sending wiring boards 28A and 28B are plugged into corresponding slots, modulation signals SMA-SMF from the sending wiring boards 28A and 28B are output to the multiplexer circuit 24. If receiving wiring boards 30C and 30D are plugged into the corresponding slots instead of the sending wiring boards, output signals SDA-SDF from the branching circuit 20 are applied to the receiving wiring boards 30C and 30D.

In the system control circuit 34, control data DA-DF allocated to the slots 22A-22F, respectively, are output to the slots 22A-22F, whereupon the operating frequencies of the sending wiring boards and the receiving wiring boards plugged into the slots are set at frequencies assigned to the respective slots 22A-22F.

Figure 3:
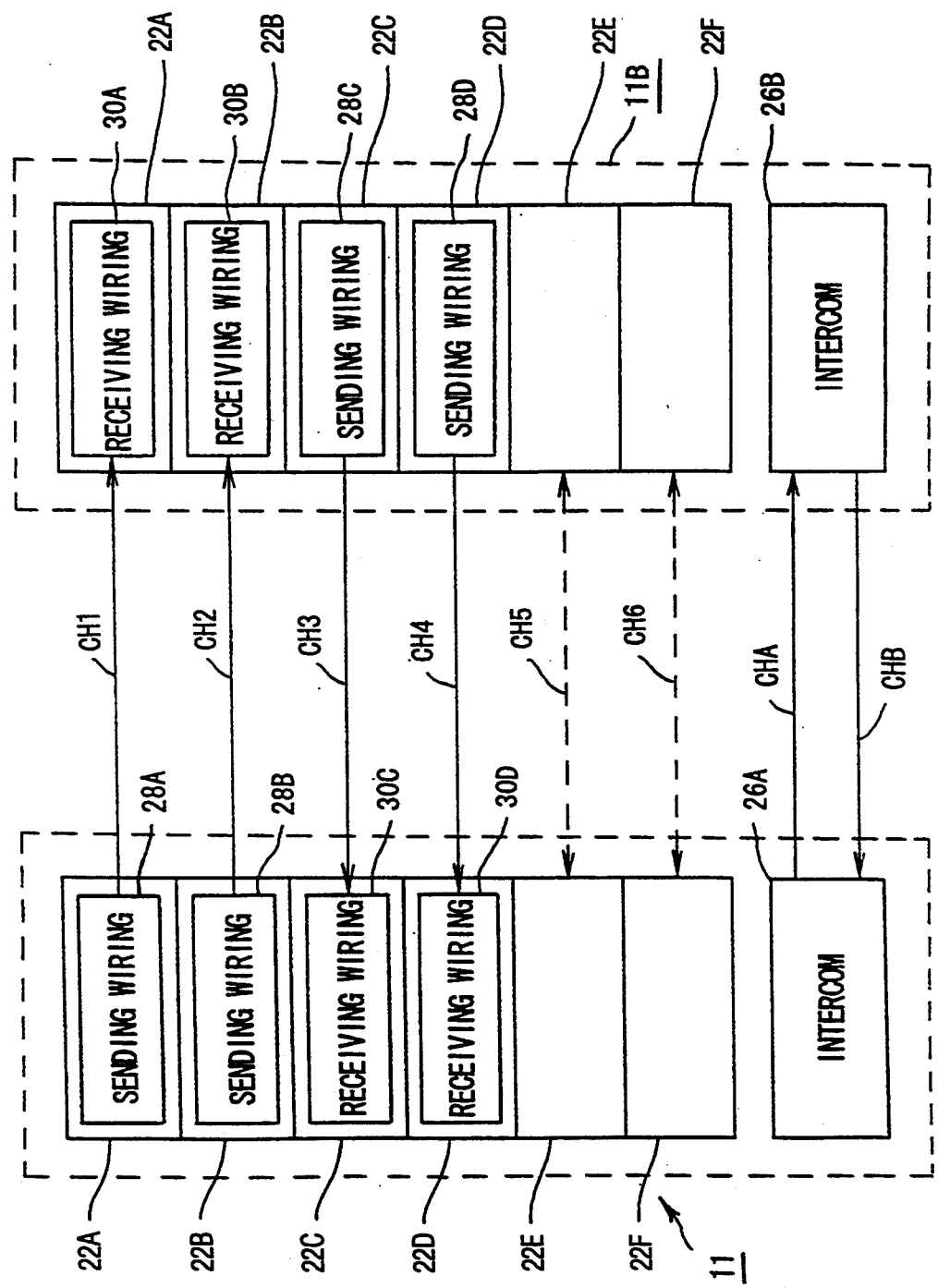
FIG. 3 is a schematic diagram for explaining channel allocation in the FIG. 1 apparatus.

Thus, in the optical atmospheric link apparatus 11, as shown in FIG. 3, when the sending wiring boards 28A and 28B are plugged into the first and second slots 22A and 22B, respectively, the center frequencies of the modulation signals from the sending boards 28A and 28B are set as the frequencies of the first and second channels CH1 and CH2, respectively.

When the receiving wiring boards 30C and 30D are respectively housed in the third and fourth slots 22C and 22D, the center frequencies for demodulation on the receiving wiring boards 30C and 30D are set at the frequencies of the third and fourth channels CH3 and CH4, respectively. Hence, with regard to a remote optical atmospheric link apparatus 11B (or "communicating object" lB), if receiving wiring boards 30A and 30B are plugged into the corresponding first and second slots 22A and 22B, respectively, of the communicating object 11B, modulation signals can be transmitted from the optical atmospheric link apparatus 11 to the communicating object 11B through the first and second channels CH1 and CH2, respectively. Furthermore, with regard to the communicating object 11B, if sending wiring boards 28C and 28D are plugged into the corresponding third and fourth slots 22C and 22D, respectively, the modulation signals thus sent from the communicating object 11B can be received (by apparatus 11) through the third and fourth channels CH3 and CH4, respectively.

Two or more slots are arranged so that a sending wiring board or a receiving wiring board can be selectively plugged into each of such slots. The operating frequencies of these wiring boards are set at frequencies predetermined to the respective slots.

In the optical atmospheric link apparatus 11, each of the six slots can be used for either one of the sending wiring boards or one of the receiving wiring boards. Thus, the setting of sending and receiving channels can be simplified through miniaturization of the whole system.

Moreover, in the system control circuit 34, the bits of an input port are assigned respectively to the connectors of the slots 22A-22F. The connection lines of the connectors which house sending wiring boards 28 are connected to the power supply, whereas the connection lines of the connectors which house receiving wiring boards 30 are grounded.

In the system control circuit 34, a determination is made as to whether a sending wiring board 28 or a receiving wiring board 30 is housed in each of the slots 22A-22F, and the sending and receiving frequencies are set based on the result of that determination.

That is, in the system control circuit 34, when a sending wiring board 28 is housed in the first slot 22A, the frequencies of the sending and receiving channels of intercom circuit 26 are set to CHA and CHB, respectively.

By contrast, when a receiving wiring board 30 is housed in the first slot 22A, the sending and receiving channels of the intercom circuit 26 are set to CHB and CHA, respectively.

Thus, in the optical atmospheric link apparatus 11, the frequency of the intercom circuit 26 is set according to the type of board housed in the first slot 22A, whereupon a communication line can be secured without interchangeability being lost.

Moreover, in the optical atmospheric link apparatus 11, if neither a sending wiring board 28 nor a receiving wiring board 30 is housed in the first slot 22A, then the system will detect a wiring board housed in the second slot 22B. If a sending wiring board 28 is housed in the second slot 22B, the sending and receiving channels of the intercom circuit 26 are set to CHA and CHB, respectively.

In this connection, if a receiving wiring board 30 is housed in the second slot 22B with neither a sending wiring board 28 nor a receiving wiring board 30 housed in the first slot 22A, the sending and receiving channels of the intercom circuit 26 are set to CHB and CHA, respectively.

Furthermore, when neither a sending wiring board 28 nor a receiving wiring board 30 is housed in either of the first or seconds slots 22A, 22B, then the system will detect a wiring board plugged in the third slot 22C. Depending on whether a sending wiring board 28 or a receiving wiring board 30 is housed (and plugged) in the third slot 22C, the sending and receiving channels of the intercom circuit 26 are set to the first intercom channel CHA and the second intercom channel CHB, respectively, or else to the second intercom channel CHB and the first intercom channel CHA, respectively.

Similarly, in the optical atmospheric link apparatus 11, when no wiring boards are plugged in the first to third slots 22A to 22C, the sending and receiving channels of the intercom circuit 26 are set according to the wiring board housed in the fourth slot 22D. When no wiring boards are plugged in the first to fourth slots 22A to 22D, the sending and receiving channels of the intercom circuit 26 are set according to the wiring board housed in the fifth slot 22E. When no wiring boards are plugged in the first to fifth slots 22A to 22E, the sending and receiving channels of the intercom circuit 26 are set according to the wiring board housed in the sixth slot 22F.

Figure 9:
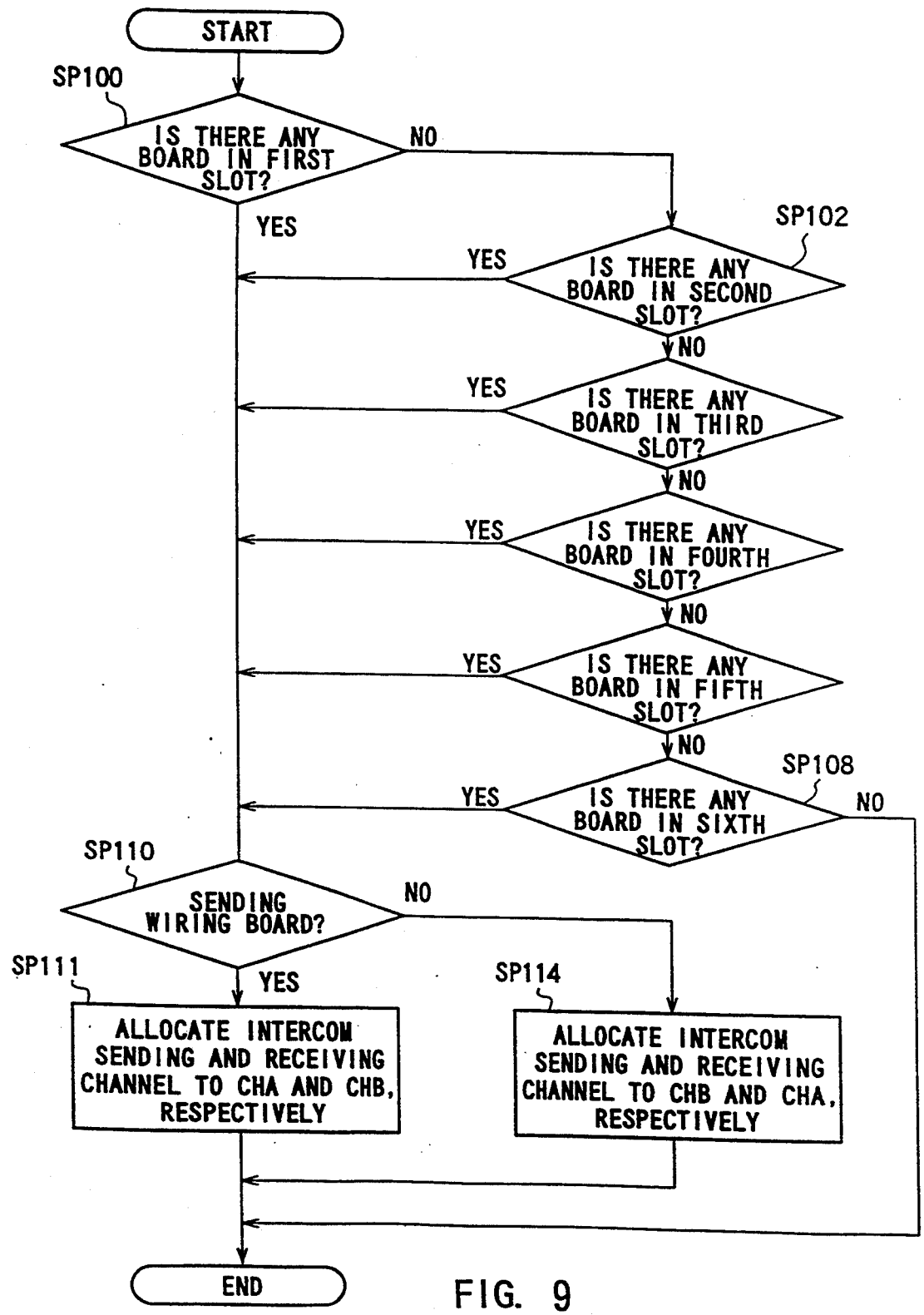
FIG. 9 is a flow chart of a preferred method by which the invention allocates intercom sending and receiving channel frequencies.

FIG. 9 is a flow chart summarizing the preferred method for setting the frequencies of the sending and receiving channels of intercom circuit 26. As shown in FIG. 9, in step 100 (immediately after initialization) the wiring board distinguishing means in control circuit 34 determines whether there is any wiring board in the first slot 22A. If not, the wiring board distinguishing means performs step 102 to determine whether there is any wiring board in the second slot 22B. This process can repeat (each time for a different slot) until the wiring board distinguishing means performs step 108 to determine whether there is any wiring board in the sixth slot 22F. If not, the process ends.

If the wiring board distinguishing means determines that a wiring board is housed in any of the slots, it then performs step 110 to determine whether the first detected board is a sending wiring board 28. If it determines that the board is a sending wiring board, then the control circuit 34 performs step 111, allocating the intercom sending and receiving channels to channels (i.e., frequencies) CHA and CHB, respectively. If it is determined in step 110 that the board is not a sending wiring board, then control circuit 34 assumes the board is a receiving wiring board 30 and performs step 114, allocating the intercom sending and receiving channels to channels CHB and CHA, respectively.

Figure 4:
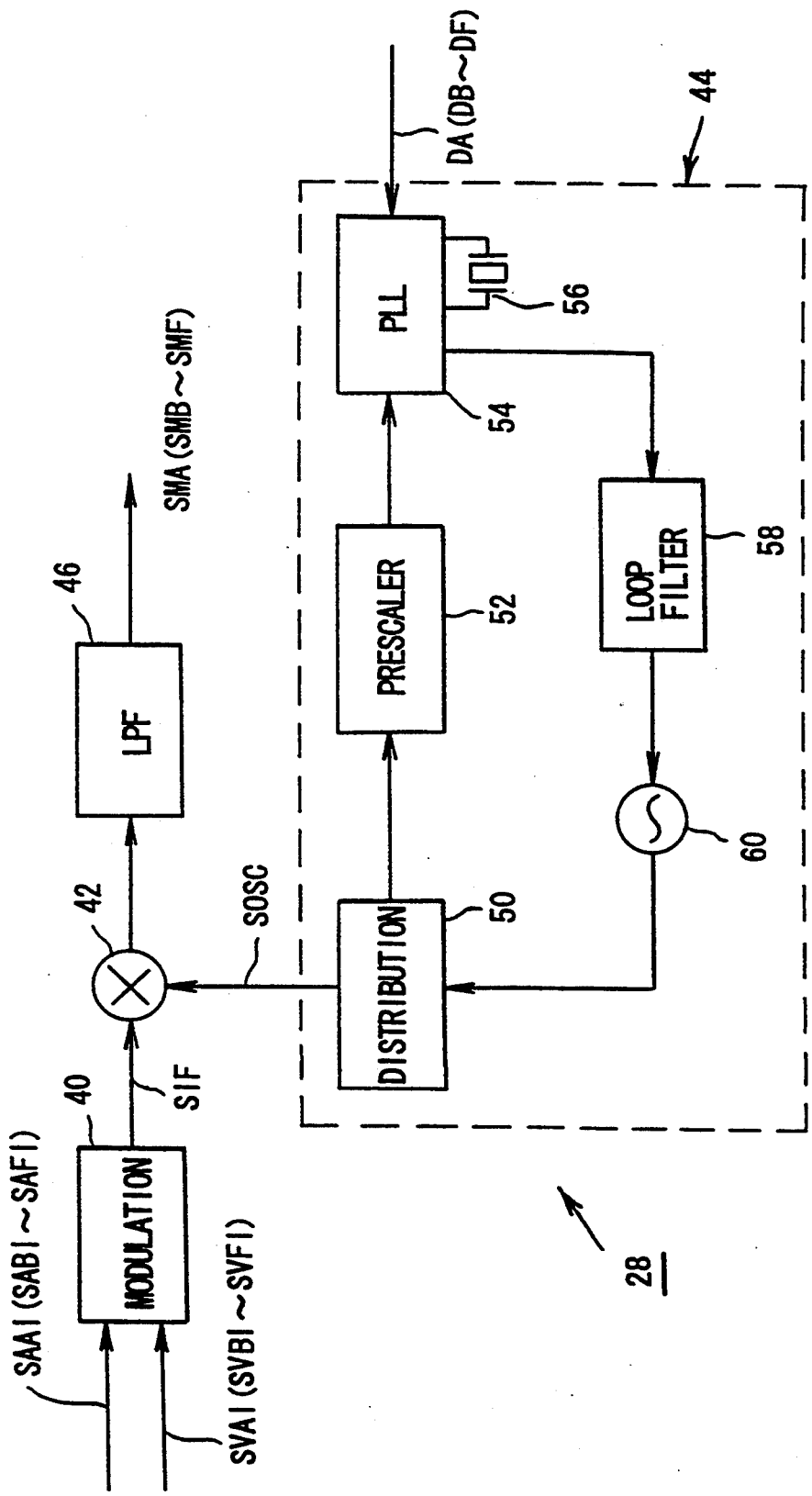
FIG. 4 is a block diagram of a sending wiring board which can be utilized in the FIG. 1 apparatus.

As shown in FIG. 4, if sending wiring boards 28 are housed in the slots 22A to 22F, video signals SVAI (SVBI to SVFI) are input through specified connectors arranged on the cabinet, and audio signals SAAI (SABI to SAFI) which are associated with the respective video signals are also input through the connectors. One video signal SVAI (SVBI to SVFI) and at least one audio signal SAAI (SABI to SAFI) are supplied to the modulation circuit 40 within each board 28.

The modulation circuit 40 frequency-modulates the video signals SVAI and the audio signals SAAI with a specified center frequency, and thereby forms an intermediate frequency signal SIF composed of modulation signals with the specified frequency. This intermediate frequency signal SIF is then output to a mixer 42.

The mixer 42, consisting of a double-balanced mixer composed of a ring modulation circuit configuration, multiplies the local oscillation signal SOSC from a local oscillation circuit 44 by the center frequency SIF, and outputs the result via a low-pass filter circuit (LPF) 46.

In the optical atmospheric link apparatus 11, the frequency of the local oscillation signal SOSC is changed according to control data DA (DB to DF) from the system control circuit 34. Each sending wiring board 28 outputs a modulation signal SMA (SMB to SMF) having the center frequency assigned to its particular slot 22A to 22F.

That is, in the local oscillation circuit 44, some part of the distributed output of a distributor 50 is fed as a local oscillation signal SOSC to the mixer 42, and the rest of the distributed output is frequency-divided by a prescaler 52 before being output to a PLL circuit 54.

The PLL circuit 54 cyclically counts reference signals generated by a quartz oscillator 56, draws a comparison in phase between the result of this counting and the frequency-divided output, and changes this count in accordance with control data DA (DB to DF) from the system control circuit 34.

The result of this phase comparison is provided through a loop filter circuit 58 to a voltage-controlled oscillation circuit 60, the output signals of which are then output to the distribution circuit 50.

Thus, in the local oscillation circuit 44, the center frequency of modulation signals SMA (SMB to SMF) can be changed by means of switching control data DA (DB to DF). Since the switching control data DA (DB to DF) are provided to each of the slots 22A to 22F, the frequencies of modulation signals SMA (SMB to SMF) can be set at frequencies corresponding to the respective slots 22A to 22F on a common sending wiring board.

Figure 5:
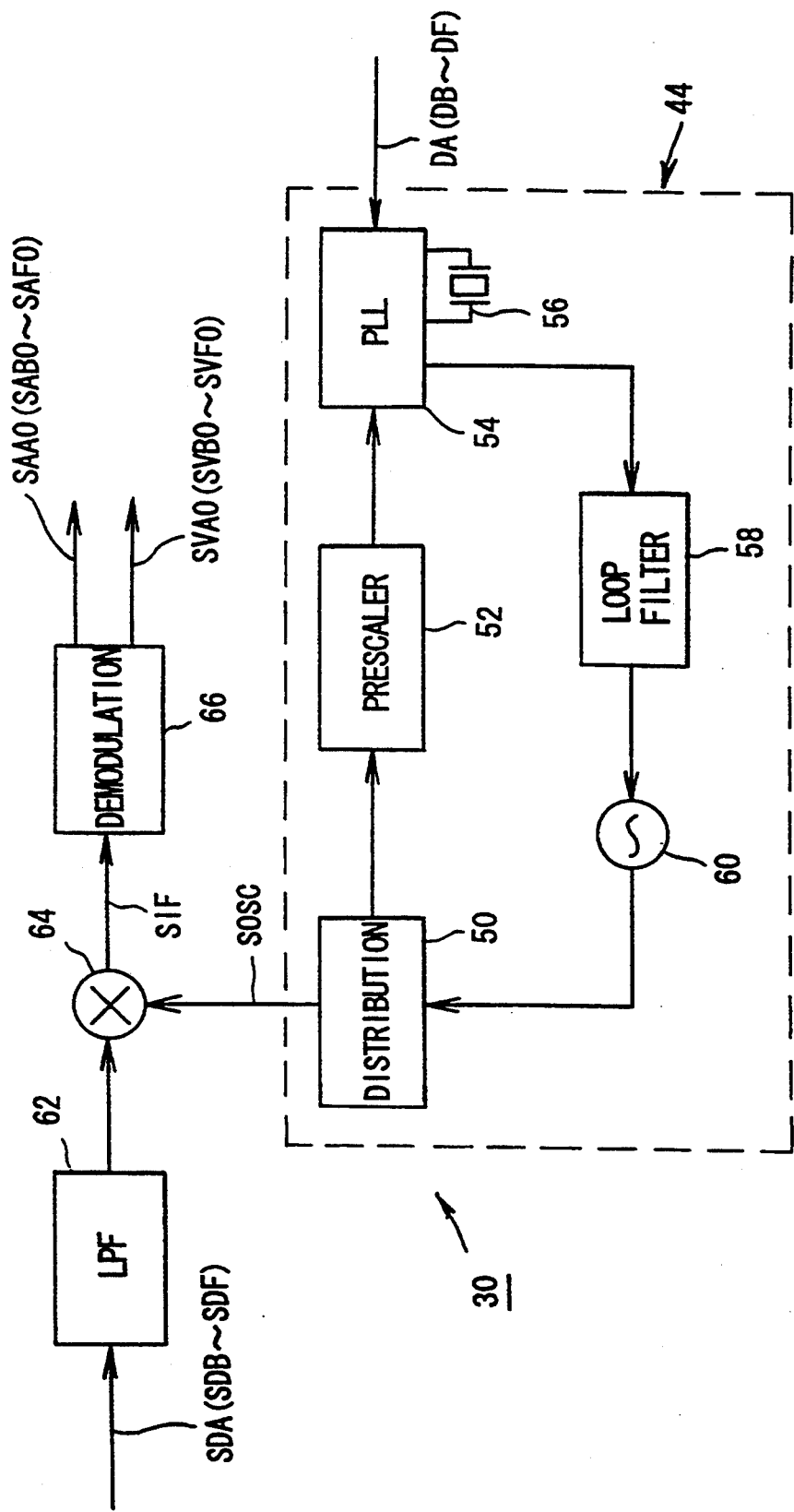
FIG. 5 is a block diagram of a receiving wiring board which can be utilized in the FIG. 1 apparatus.

In the receiving wiring board 30, by contrast, as shown in FIG. 5, the output signals SDA (SDB to SDF) of distribution circuit 20 are received through a low-pass filter circuit (LPF) 62 into a mixer 64, and are multiplied therein by the local oscillation signal SOSC of a local oscillation circuit 44.

The mixer 64 and the local oscillation circuit 44 of the receiving board have the same configuration as the mixer 42 and local oscillation circuit 44 of the sending wiring board 28. Thus, local oscillation signals SOSC with frequencies corresponding to the respective slots 22A to 22F are generated similarly to the manner in which they are generated in the sending wiring board 28.

The demodulation circuit 66 receives a center frequency signal SIF from the mixer 64. The demodulation circuit 66 then limits the frequency band of the center frequency signal SIF and demodulates the limited center frequency signal so as to output two channels of audio signals SAAO (SABO to SAFO) and video signals SVAO (SVBO to SVFO).

Thereupon, in the optical atmospheric link apparatus 11, it becomes possible to demodulate audio and video signals through channels allocated to the slots 22A to 22F, even if a receiving wiring board 30 is housed therein instead of a sending wiring board 28. Thereby, sending and receiving channels can be set simply and surely.

Figure 6:
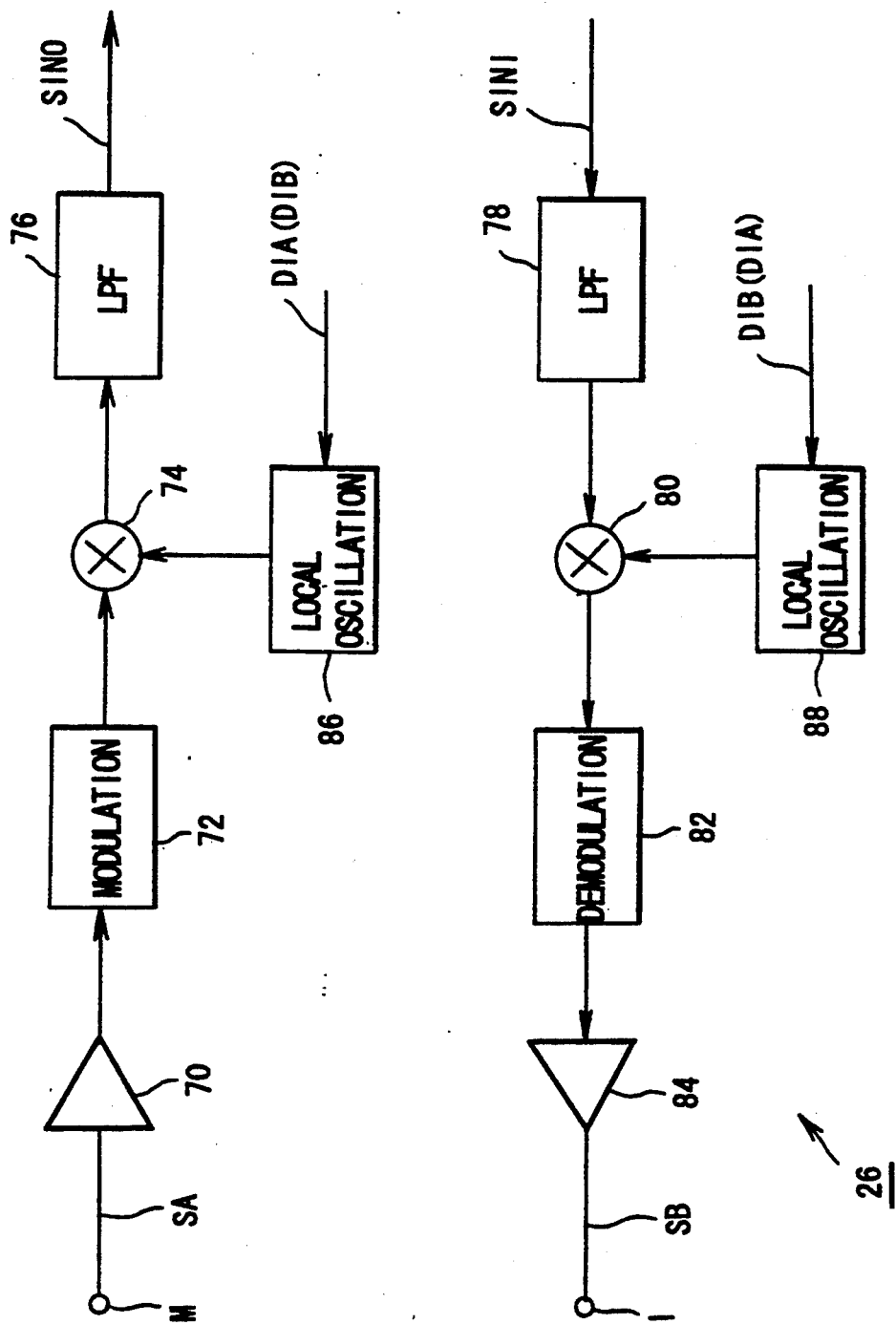
FIG. 6 is a block diagram of an intercom circuit which can be included in the FIG. 1 apparatus.
Figure 7:
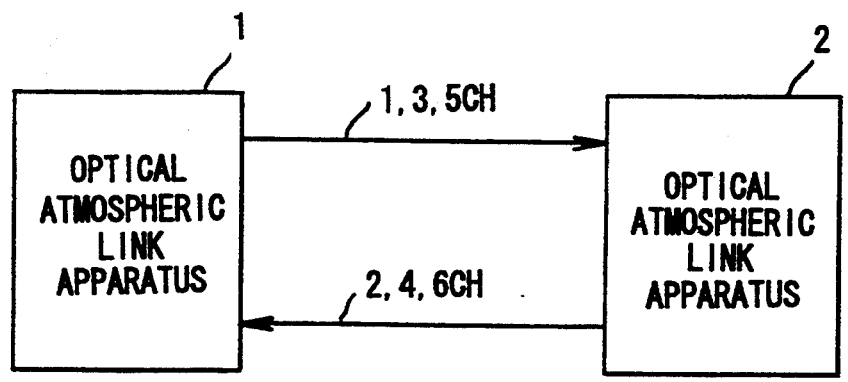
FIG. 7 is a schematic diagram for explaining channel allocation in a conventional transmission apparatus.
Figure 8:
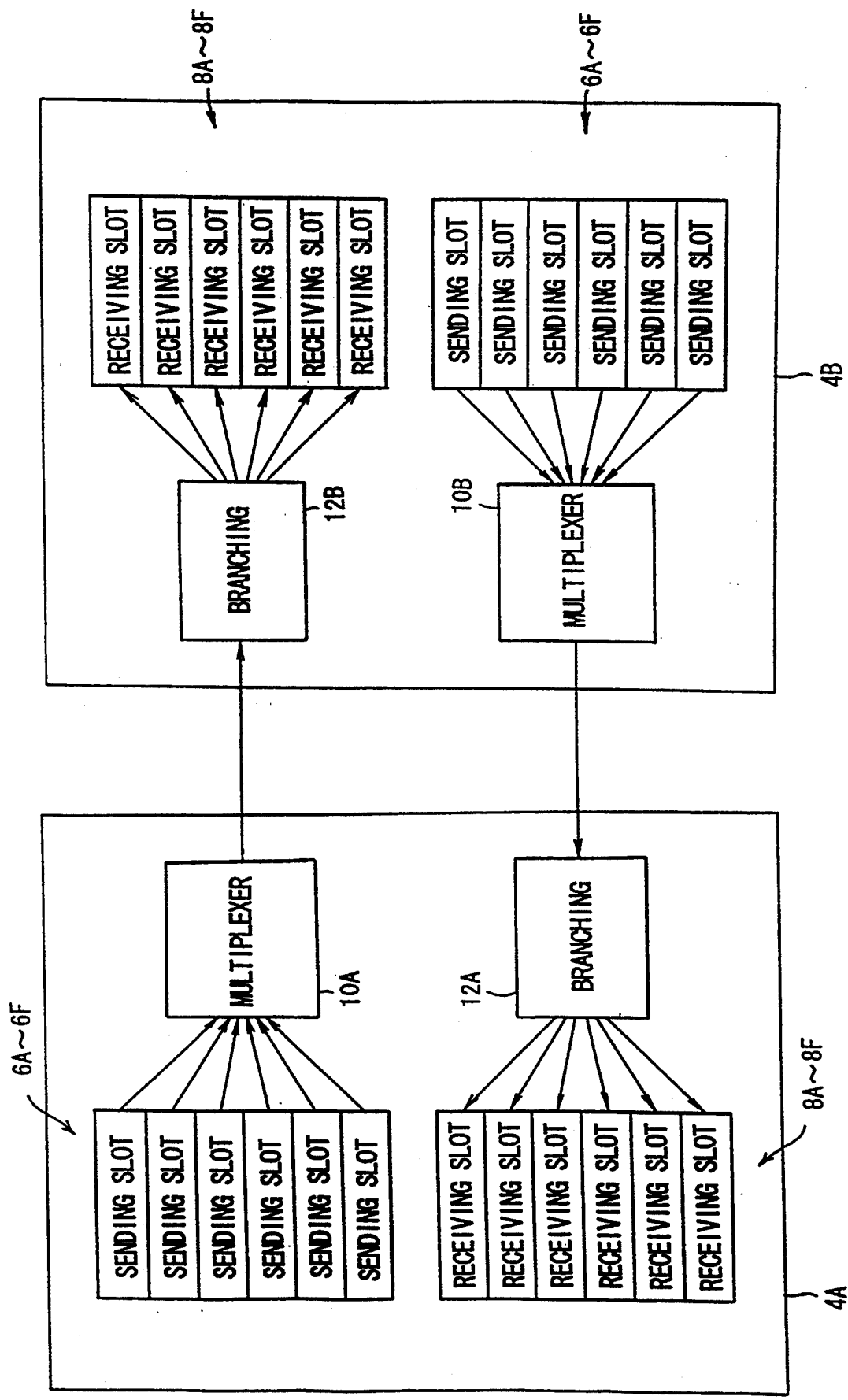
FIG. 8 is a schematic diagram of a conventional transmission apparatus in which a first set of slots house a set of sending wiring boards and another set of slots house a set of receiving wiring boards.

In the optical atmospheric link apparatus 11, as shown in FIG. 6, it is possible to input and output an operator/repeater's audio signals SA and SB with a communicating object via the microphone jack M and earphone jack I on the cabinet control panel. These audio signals are exchanged as communication signals with the communicating object.

That is, in the intercom circuit 26, an audio signal SA input through the microphone jack M is amplified by an amplifier 70, frequency-modulated by a demodulator 72, frequency-converted by a mixer 74, and output through a low-pass filter 76 to the optical multiplexer circuit 24.

Moreover, in the intercom circuit 26, the output signal SINI of the optical branching circuit 20 is sent through a low-pass filter circuit 78 to a mixer 80, therein undergoing frequency conversion. The resulting signal is further demodulated by a demodulator 82, the output signal of which is then output through an amplifier 84 to the earphone jack I.

With regard to the sending and receiving systems in the intercom circuit 26, respective local oscillation circuits 86 and 88 of the sending and receiving systems are composed of PLL circuits, similar to the construction of the sending board 28 and the receiving board 30. The oscillation frequency of the local oscillation circuits 86 and 88 can be changed according to control data DIA and DIB output from the system control circuit 34.

Thus, in the optical atmospheric link apparatus 11, the control data DIA and DIB are output corresponding to the sending wiring boards 28 and the receiving wiring boards 30 housed in the first to sixth slots 22A to 22F. The control data DIA and DIB change the oscillation frequency of the local oscillation circuits 86 and 88, whereupon it also becomes possible to set the related communication lines to interference-free frequencies as necessary.

According to the above configuration, a plurality of slots are provided so that sending wiring boards and receiving wiring boards can be housed interchangeably. Based on interchangeability between optical atmospheric link apparatus, the invention allows the simple and easy setting of frequencies of transmitting and receiving channels through the setting of the operating frequencies of the sending and receiving wiring boards housed in these slots at the respective frequencies assigned to each of the slots.

The above-described configuration also allows the frequencies of sending and receiving channels to be set simply and easily for communication (intercom) lines as well, by changing the behavior of the intercom circuit in accordance with the sending and receiving wiring boards housed in the corresponding slots.

The above described embodiments have dealt with the case where control data are output from a system control circuit to set channels. However, the invention is not limited to this, but also may be applied to other cases, e.g., where control data are output through formed logic circuits.

Moreover, the above described embodiments have dealt with the case where channels are set for six slots and an intercom circuit. However, the invention is not limited to this, but also allows other variations, e.g., where various numbers of channels may be selected as necessary, and/or where the intercom circuit may be omitted.

Furthermore, the above described embodiments have dealt with the case where the invention is applied to optical atmospheric link apparatus to transmit video and audio signals. However, the invention is not limited to this, but can also be widely applied to other cases, such as to the transmission of various information signals, the exchange of information signals through optical fibers, and the bidirectional transmission of desired information signals by the use of microwave lines.

As described above, according to this invention, the operation frequencies of wiring boards are variably set at specific frequencies assigned to respective board slots, and each slot can variably accommodate one of two or more different sending and receiving boards. Therefore, a bidirectional transmission device allowing the frequencies of sending and receiving channels to be set simply and easily as necessary is obtained, while maintaining interchangeability with communicating objects.

Preferably, the data DA-DF assign a different operating frequency to each of the slots 22A-22F, regardless of which (if any) type of wiring board is plugged into each of the slots.

The invention is not limited to the above described embodiments. Various changes or modifications could be effected by those skilled in the art without departing from the spirit or scope of the appended claims.

What is claimed is:

1. A bidirectional transmitting apparatus, for use in a bidirectional communication system including both the apparatus and a terminal remotely located therefrom for bidirectionally transmitting information signals between the apparatus and the terminal, the bidirectional transmitting apparatus comprising:

- a housing means having at least two slots, wherein each of the slots can removably receive one of a sending wiring board and a receiving wiring board, each sending wiring board including a modulation circuit for modulating an information signal to generate a modulated information signal and a modulation frequency control circuit for controlling a modulation frequency of the modulation circuit, and each receiving wiring board including a demodulation circuit for demodulating a modulated information signal at a demodulation frequency to generate a demodulated information signal and a demodulation frequency control circuit for controlling the demodulation frequency;
- multiplexing means connected to each of the slots for multiplexing each modulated information signal supplied from each sending wiring board housed in one of the slots to generate a first multiplexed signal;
- transmitting means connected to the multiplexing means for receiving the first multiplexed signal and transmitting the first multiplexed signal toward the terminal;
- receiving means for receiving a second multiplexed signal transmitted from the terminal;
- distributing means connected to the receiving means for producing a plurality of modulated information signals from the second multiplexed signal from the receiving means and distributing the modulated information signals to the slots; and
- control means for controlling the modulation frequency control circuit of each sending wiring board in one of the slots according to which of the slots houses the sending wiring board, and for controlling the demodulation frequency control circuit of each receiving wiring board in one of the slots according to which of the slots houses the receiving wiring board.

2. The bidirectional transmitting apparatus of claim 1, further comprising:

- intercom means having a first intercom circuit connected to the multiplexing means, and a second intercom circuit connected to the distributing means, wherein the first intercom circuit comprises:
- an intercom modulating circuit for modulating a sending intercom signal produced in the apparatus, to generate a modulated sending intercom signal having an intercom modulation frequency, and
- an intercom modulating frequency control circuit for controlling the intercom modulating frequency; and wherein the second intercom circuit comprises:
- an intercom demodulating circuit for demodulating a modulated receiving intercom signal at an intercom demodulation frequency to generate a demodulated receiving intercom signal indicative of information from the terminal, and
- an intercom demodulating frequency control circuit for controlling the intercom demodulating frequency of the intercom demodulating circuit; and wherein the control means also includes:
- a detect means for detecting whether a sending wiring board or a receiving wiring board is housed in each of the slots; and
- intercom control means for controlling the intercom modulating frequency control circuit and the intercom demodulating frequency control circuit in accordance with an output signal of the detect means.

3. The bidirectional transmitting apparatus of claim 2, wherein the detect means sequentially addresses the slots until detecting a sending wiring board or a receiving wiring board in one of the slots.

4. The bidirectional transmitting apparatus of claim 1, wherein the transmitting means comprises a light source means for generating a light beam.

5. The bidirectional transmitting apparatus of claim 2, wherein the intercom means is fixedly mounted in the apparatus.

6. The bidirectional transmitting apparatus of claim 1, wherein the information signal is a video signal.

7. A bidirectional transmitting system having a first terminal and a second terminal remotely located from the first terminal, for transmitting information signals bidirectionally between the first terminal and the second terminal, the first terminal comprising:

- housing means for removably receiving a sending wiring board and a receiving wiring board, wherein the sending wiring board includes a modulation circuit for modulating an information signal at a modulation frequency to generate a modulated information signal, and wherein the receiving wiring board includes a demodulation circuit for demodulating a modulated information signal at a demodulation frequency to generate a alemodulated information signal;
- intercom means having a first intercom circuit and a second intercom circuit, the first intercom circuit having a intercom modulating circuit for modulating a sending intercom signal indicative of an information of the first terminal to generate a modulated sending intercom signal and an intercom modulating frequency control circuit for controlling the intercom modulating frequency, and the second intercom circuit having an intercom alemodulating circuit for demodulating a modulated receiving intercom signal at an intercom demodulating frequency to generate a demodulated receiving intercom signal indicative of an information of the second terminal and an intercom demodulating frequency control circuit for controlling the intercom demodulating frequency;
- multiplexing means connected to both the housing means and the intercom means for multiplexing each modulated information signal with each modulated sending intercom signal thereby generating a first multiplexed signal;
- transmitting means for transmitting the multiplexed signal toward the second terminal when the sending wiring board is housed in the housing means;
- receiving means for receiving a second multiplexed signal from the second terminal when the receiving wiring board is housed in the housing means;
- distributing means connected to the receiving means for producing from second multiplexed signal from the second terminal, a modulated information signal and a modulated receiving intercom signal;

detect means for detecting whether a sending wiring board or a receiving wiring board is housed in the housing means; and control means for controlling the intercom modulating frequency control circuit to a first frequency when the detect means detects a sending wiring board is housed in the housing means and for controlling the intercom demodulating frequency control circuit to a second frequency different from the first frequency when the detect means detects a receiving wiring board is housed in the housing means.

8. The bidirectional transmitting system of claim 7, wherein the transmitting means includes a light source means for generating a light beam.

9. The bidirectional transmitting system of claim 7, wherein the intercom means is fixedly mounted in the first terminal.

10. The bidirectional transmitting system of claim 7, wherein the housing means has a plurality of slots, each slot being capable of removably housing one sending wiring board and each slot being capable of removably housing one receiving wiring board and wherein the detect means detects whether a sending wiring board or a receiving wiring board is housed in a predetermined slot of the plurality of slots.

11. The bidirectional transmitting system of claim 10, wherein the detect means sequentially addresses the slots until detecting a sending wiring board or a receiving wiring board in one of the slots.

12. The bidirectional transmitting apparatus of claim 1, wherein the demodulated information signal is a video signal.

13. The bidirectional transmitting apparatus of claim 12, wherein the information signal is a video signal.

* * * * *

UNITED STATES PATENT AND TRADEMARK OFFICE
CERTIFICATE OF CORRECTION

PATENT NO. : 5,424,860
DATED : Jun. 13, 1995
INVENTOR(S) : Kanji Mihara

It is certified that error appears in the above-indentified patent and that said Letters Patent is hereby corrected as shown below:

At column 1, line 34, "atmospheric .link" should read --atmospheric link--.

At column 12, line 35, "alemodu-" should read --demodu---.

At column 12, line 45, "alemodulating" should read --demodulating--.

Signed and Sealed this

Tenth Day of October, 1995

Attest:

BRUCE LEHMAN

Attesting Officer    Commissioner of Patents and Trademarks